(12) United States Patent
Chen

(10) Patent No.: US 9,115,726 B2
(45) Date of Patent: Aug. 25, 2015

(54) HOUSING OF COOLING FAN AND METHOD MANUFACTURING OF THE SAME

(75) Inventor: Wen-Cheng Chen, New Taipei (TW)

(73) Assignee: Foxconn Technology Co., Ltd., New Taipei (TW)

( * ) Notice: Subject to any disclaimer, the term of this patent is extended or adjusted under 35 U.S.C. 154(b) by 368 days.

(21) Appl. No.: 13/612,897

(22) Filed: Sep. 13, 2012

(65) Prior Publication Data

US 2014/0030075 A1    Jan. 30, 2014

(30) Foreign Application Priority Data

Jul. 26, 2012 (TW) ............................ 101126992 A

(51) Int. Cl.
F04D 29/42 (2006.01)
B29C 45/14 (2006.01)
F04D 29/62 (2006.01)

(52) U.S. Cl.
CPC ...... *F04D 29/4226* (2013.01); *B29C 45/14344* (2013.01); *F04D 29/626* (2013.01)

(58) Field of Classification Search
CPC . F04D 25/0613; F04D 29/422; F04D 29/426; B29C 45/14344
USPC ............ 415/182.1, 232, 213.1, 214.1, 219.1, 415/222, 200, 203, 206
See application file for complete search history.

(56) References Cited

U.S. PATENT DOCUMENTS

| 7,140,837 B2* | 11/2006 | Ku et al. ..................... 415/121.2 |
| 8,123,475 B2* | 2/2012 | Yang et al. ..................... 415/220 |
| 2002/0122733 A1* | 9/2002 | Lin et al. ..................... 417/423.5 |
| 2009/0169377 A1* | 7/2009 | Horng ....................... 415/213.1 |
| 2011/0108251 A1* | 5/2011 | Horng ............................. 165/121 |
| 2011/0194930 A1* | 8/2011 | Ai et al. ..................... 415/182.1 |

* cited by examiner

Primary Examiner — Dwayne J White
Assistant Examiner — William Grigos
(74) Attorney, Agent, or Firm — Novak Druce Connolly Bove + Quigg LLP

(57) ABSTRACT

An exemplary housing of a cooling fan includes a metallic base plate and a plastic bear seat. Clasps extend upwardly from the base plate. The bear seat is formed on the base plate via injection process. A bottom end of the bear seat directly contacts the base plate. The clasps are embedded in the bear seat.

10 Claims, 5 Drawing Sheets

HOUSING OF COOLING FAN AND METHOD MANUFACTURING OF THE SAME

BACKGROUND

1. Technical Field

The disclosure generally relates to cooling fans, and more particularly to a housing of a cooling fan having stable and reliable performance and suitable for a thin electronic device.

2. Description of Related Art

A conventionally cooling fan includes a housing, a cover covering the housing, and a blade assembly received in housing. The housing includes a base plate and a bear seat mounted on the base plate. The blade assembly is mounted on the bear seat via a bearing. Generally, the bear seat and the base plate are integrated formed by molten plastic received in an injection mold. A thickness of the base plate and the bear seat formed by the injection process can not controlled to be too thin, thus thin and smaller bear seat and base plate can not obtained via the injection process. Therefore, a size of the cooling fan for a thin electronic device is affected by the housing. Furthermore, a strength of the housing formed by plastic is weak. Thus, the housing is easy to be destroyed when the housing is pressed.

What is needed, therefore, is a housing to overcome the above described shortcomings.

DETAILED DESCRIPTION

Embodiments of the present housing will now be described in detail below and with reference to the drawings.

Figure 1:
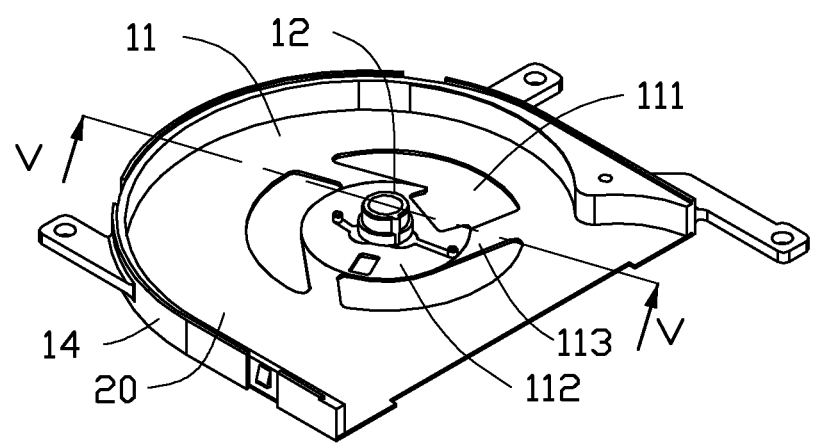
FIG. 1 is an isometric, assembled view of a housing of a cooling fan of an embodiment of the present disclosure.

Referring to FIG. 1, a housing of a cooling fan in accordance with an embodiment of the present disclosure is shown. The housing includes a base plate 11, a sidewall 14 extending upwardly from an outer periphery of the base plate 11, and a bear seat 12 mounted on a top surface of the base plate 11. The base plate 11 and the sidewall 14 cooperatively surround a space 20 therebetween. The bear seat 12 is received in the space 20. Each the base plate 11 and the sidewall 14 is a thin metallic sheet. The bear seat 12 is a plastic cylinder.

Figure 2:
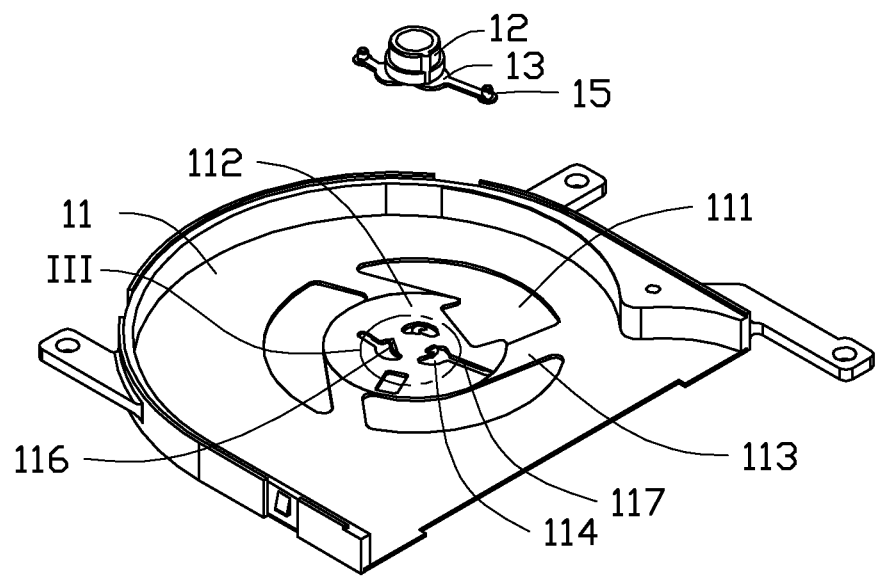
FIG. 2 is an isometric, disassembled view of the housing of FIG. 1.
Figure 3:
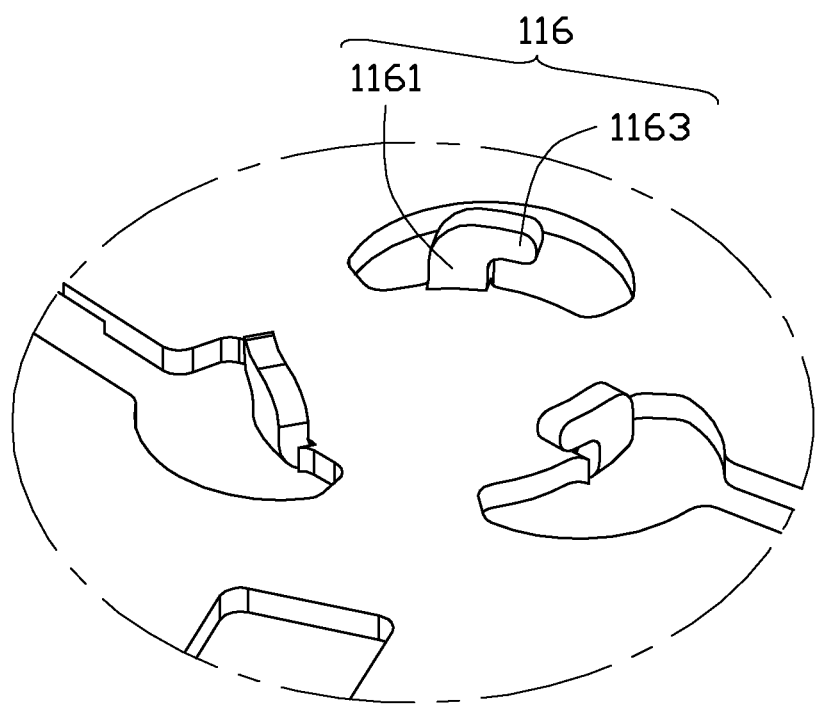
FIG. 3 is an enlarged view of a circled portion III of the housing of FIG. 2.
Figure 4:
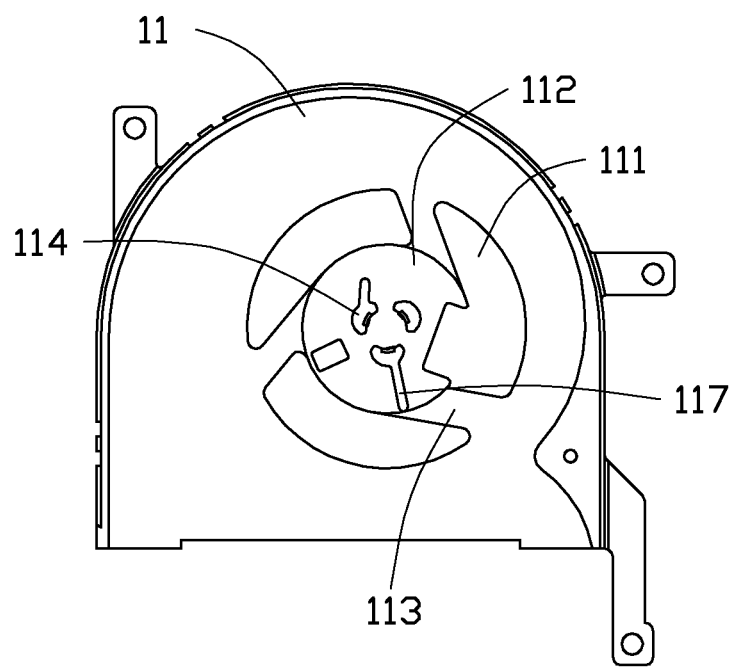
FIG. 4 is a top view of a base plate of the housing of FIG. 2.

Referring also to FIG. 2 to FIG. 4, an air inlet 111 is defined in a central portion of the base plate 11. The air inlet 111 is circular. A supporting plate 112 is located at a center of the air inlet 111. Three ribs 113 are formed in the air inlet 111. Opposite ends of each rib 113 interconnect an outer edge of the supporting plate 112 and an outer edge of the air inlet 111. The supporting plate 112 is disk-like. Each rib 113 is elongated. The ribs 113 are evenly distributed along a circumferential direction of the supporting plate 112. Top surfaces of the ribs 113 and the supporting plate 112 are coplanar. Bottom surfaces of the ribs 113 and the supporting plate 112 are coplanar. Three through holes 114 is defined in the supporting plate 112. The through holes 114 are evenly distributed along a circumferential direction of the supporting plate 112. Three clasps 116 extend upwardly from inner edges of each through hole 114. The clasps 116 are embedded in the bear seat 12 to improve an engaging strength between the bear seat 12 and the bottom plate 11. Each clasp 116 includes an arm 1161 extending upwardly from the inner edge of the through hole 114 and an extending tab 1163 bended from a top end of the arm 1161 to engage with the bear seat 12. Two slits 117 are defined in the supporting plate 112 and respectively communicate with the through holes 114 of the supporting plate 112.

Figure 5:
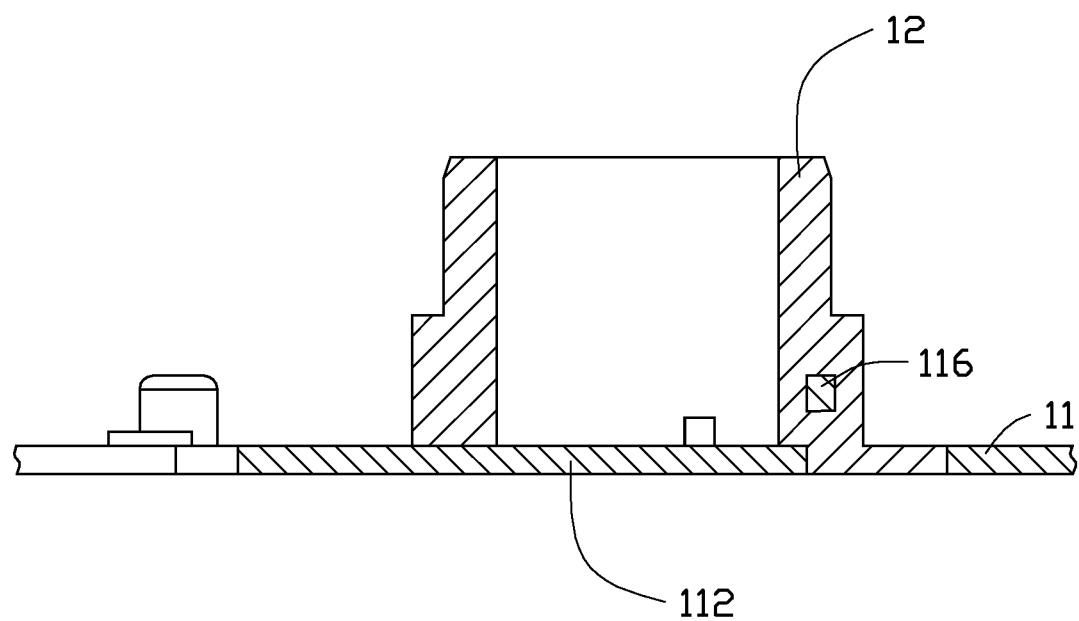
FIG. 5 is a cross sectional view of the housing of FIG. 1, taken along line V-V thereof.

Referring also to FIG. 5, the bear seat 12 is a hollow tube and a bottom end thereof is directly formed on the top surface of the supporting plate 112. The extending tab 1163 and a portion of the arm 1161 of the clasps 116 are embedded in a circumferential side wall of the bear seat 12. The extending tab 1163 extends along a circumferential direction of the circumferential side wall of the bear seat 12. Two reinforcement plates 13 extend outwardly from the bottom end of the bear seat 12. The reinforcing plates 13 are inserted in the through holes 114 and the slits 117 to further enhance the engaging strength between the bear seat 12 and the bottom plate 11. Two poles 15 are formed on an outmost end of the reinforcing plates 13 to engage with another elements (not shown) of the cooling fan.

A method for manufacturing the housing of the present disclosure includes following steps: providing a bended metallic sheet, the metallic sheet including the base plate 11 and the sidewall 14 extending upwardly from the base plate 11; providing a mold, a chamber of the mold located at a top side of the base plate 11, receiving the clasps 116 therein and communicating with two of the through holes 114 and the slits 117 of the supporting plate 112 of the base plate 11; injecting molten plastic into the chamber by an injection mold to make the molten plastic fill in the chamber and the corresponding through holes 114 and the slits 117; cooling the molten plastic and taking off the mold to make the molten plastic received in the chamber to form the bear seat 12, filled in the through holes 114 and the slits 117 to form the reinforcing plates 13. The clasps 116 are embedded in the bear seat 12. In this state, the housing is obtained.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A housing of a cooling fan comprising:
    a metallic base plate, a plurality of clasps extending upwardly from the base plate; and
    a plastic bear seat formed on the base plate via injection process, a bottom end of the bear seat directly contacting the base plate, and the clasps being embedded in the bear seat;
    wherein a plurality of through holes is defined in the base plate, and a plurality of reinforcing plates is formed on the bear seat and inserted in the through holes, respectively, a plurality of slits communicates with the through holes, and the reinforcing plates are inserted in the slits, respectively.

2. The housing of a cooling fan of claim 1, wherein each clasp comprises an arm extending from the base plate and a tab bended from a top end of the arm, and the tab and a portion of the arm are embedded in a circumferential side wall of the bear seat.

3. The housing of a cooling fan of claim 1, wherein the extending tab extends along a circumferential direction of a circumferential side wall of the bear seat.

4. The housing of a cooling fan of claim 1, wherein the clasps extend from inner edges of the through hole.

5. The housing of a cooling fan of claim 1, wherein the bear seat is a hollow tube.

6. The housing of a cooling fan of claim 1, wherein an air inlet is defined in the base plate, and a supporting plate is located at a center of the air inlet, the clasps extending from the supporting plate, the bear seat formed on the supporting plate.

7. The housing of a cooling fan of claim 6, wherein a plurality of ribs are formed in the air inlet and opposite ends of each rib interconnect an outer edge of the supporting plate and an outer edge of the air inlet.

8. The housing of a cooling fan of claim 7, wherein the ribs are evenly distributed along a circumferential direction of the supporting plate.

9. The housing of a cooling fan of claim 7, wherein top surfaces of the ribs and the supporting plate are coplanar, and bottom surfaces of the ribs and the supporting plate are coplanar.

10. The housing of a cooling fan of claim 1, wherein a sidewall extends upwardly from an outer periphery of the base plate, and the sidewall and the base plate cooperatively define a space therebetween to receive the bear seat therein.

\* \* \* \* \*